(12) United States Patent
De La Torre-Bueno

(10) Patent No.: US 6,697,509 B2
(45) Date of Patent: Feb. 24, 2004

(54) METHOD AND APPARATUS FOR SCORING THE UPTAKE OF MARKERS IN CELLS

(75) Inventor: Jose De La Torre-Bueno, Encinitas, CA (US)

(73) Assignee: Chromavision Medical Systems, Inc., San Juan Capistrano, CA (US)

(*) Notice: Subject to any disclaimer, the term of this patent is extended or adjusted under 35 U.S.C. 154(b) by 0 days.

(21) Appl. No.: 09/972,067

(22) Filed: Oct. 4, 2001

(65) Prior Publication Data
US 2003/0068076 A1 Apr. 10, 2003

(51) Int. Cl.⁷ .................................................. G06K 9/00
(52) U.S. Cl. ...................................................... 382/133
(58) Field of Search ................................. 382/128, 129, 382/133, 134; 250/461.2; 600/312, 313; 430/142, 143, 211, 213, 218, 222, 235, 45, 47, 390, 391, 392, 457, 517; 359/491; 377/10, 11, 12

(56) References Cited

U.S. PATENT DOCUMENTS

| | | | |
|---|---|---|---|
| 5,202,931 A | 4/1993 | Bacus | 382/133 |
| 5,420,042 A * | 5/1995 | Schafer et al. | 436/517 |
| 5,846,749 A | 12/1998 | Slamon et al. | 435/7.23 |
| 5,981,279 A | 11/1999 | Weiss | 435/375 |
| 6,007,996 A | 12/1999 | McNamara et al. | 435/6 |
| 6,061,425 A * | 5/2000 | Sato | 378/50 |
| 6,165,734 A | 12/2000 | Garini et al. | 435/7.21 |
| 6,183,981 B1 | 2/2001 | Gonzalez-Lima | 435/25 |
| 6,251,586 B1 | 6/2001 | Mulshine et al. | 435/6 |

* cited by examiner

Primary Examiner—Andrew W. Johns
Assistant Examiner—Shervin Nakhjavan
(74) Attorney, Agent, or Firm—Fish & Richardson P.C.

(57) ABSTRACT

In an embodiment, an imager is used to generate an image of a sample, e.g., a tissue sample including diaminobenzidine tetrahydrochloride (DAB) stained cells. A user selects a region to be scored in the image. A mean intensity value of a selected color is determined from the pixels in the selected region. The selected color may be the complement of a color to be scored, which, in the case of a DAB test, is blue. A score is generated in response to the mean intensity value using a stored calibration curve.

30 Claims, 5 Drawing Sheets

METHOD AND APPARATUS FOR SCORING THE UPTAKE OF MARKERS IN CELLS

BACKGROUND

In many diagnostic tests of tissue samples, the amount of a marker stain present in one or more cells may be measured semi-quantitatively. For example, several methods enable the development of custom antibodies to selected proteins. These antibodies may be linked to colored stains or stain converting enzymes to develop a color test such as an immunohistochemistry (IHC) test. In this method, technicians take a thin slice of a tumor and apply an antibody, a chemical that specifically binds to estrogen receptors. If the antibody sticks to receptors on some tumor cells, adding various other chemicals will stain those cells so that they stand out when viewed under a microscope. A technician or pathologist then visually inspects the specimen, counting the proportion of cells that stain.

While the human vision system is well adapted for detecting locations and patterns of color, humans tend to have relatively poor discrimination for the absolute intensity of a color, i.e., the brightness or dullness of a color. This is a consequence of the wide dynamic range of human vision. However, in IHC tests, for example, it is generally necessary to determine the color intensity. This is because many of the tested proteins are normally present in low quantities. Moreover, the diagnostically significant event may be an elevation of the level of the protein that translates to a darker shade of the stain color.

However, when pathologists score IHC tests, the results are generally given in a semi-quantitative scale. This scale may have a whole number score that ranges from 0 to 3. It is estimated that the average accuracy of manual reads is about ±0.8 on this scale. In many IHC tests, this may be enough uncertainty to give rise to diagnostic uncertainties. For instance, in the test for the Her2NU protein in breast cancer, a result of 0 or 1 may be an indication not to treat with Herceptin, and a score of 2 or 3 may be an indication to treat. Therefore, borderline cases may be suspect if the reading error is large enough to cause a "true" 1 to be mistaken for a 2, or visa versa.

SUMMARY

In an embodiment, an imager is used to generate an image of a sample, e.g., a tissue sample including diaminobenzidine tetrahydrochloride (DAB) stained cells. A user, e.g., a pathologist, selects a region to be scored in the image. A mean intensity value of a selected color is determined from the pixels in the selected region. The selected color may be the complement of a color to be scored. In the case of a DAB test, the complementary color is blue. A score is generated in response to the mean intensity value using a stored calibration curve.

To generate the calibration curve, mean intensity values for selected regions in a number of imaged samples may be correlated to user input scores for the same regions. To generate a user input score, the user may select the region in the image to be scored. The pixels outside of the selected region may be masked. Any pixel having a color value outside of a selected color threshold corresponding to the color to be scored may also be masked. The user may then input a score for the masked region. The mean intensity values for the same regions may then be correlated to the user input scores.

More accurate and precise scores may be generated using the mean intensity value and the calibration curve than the user input scores. For example, the user input scores may be whole number, e.g., on a scale of 0 to 3, which is indicative of the accuracy and precision available with human vision and perception. The machine generated scores may be on the same scale, but may include fractional values, e.g., a score of 2.8, due to its higher accuracy and precision.

DETAILED DESCRIPTION

Figure 1:
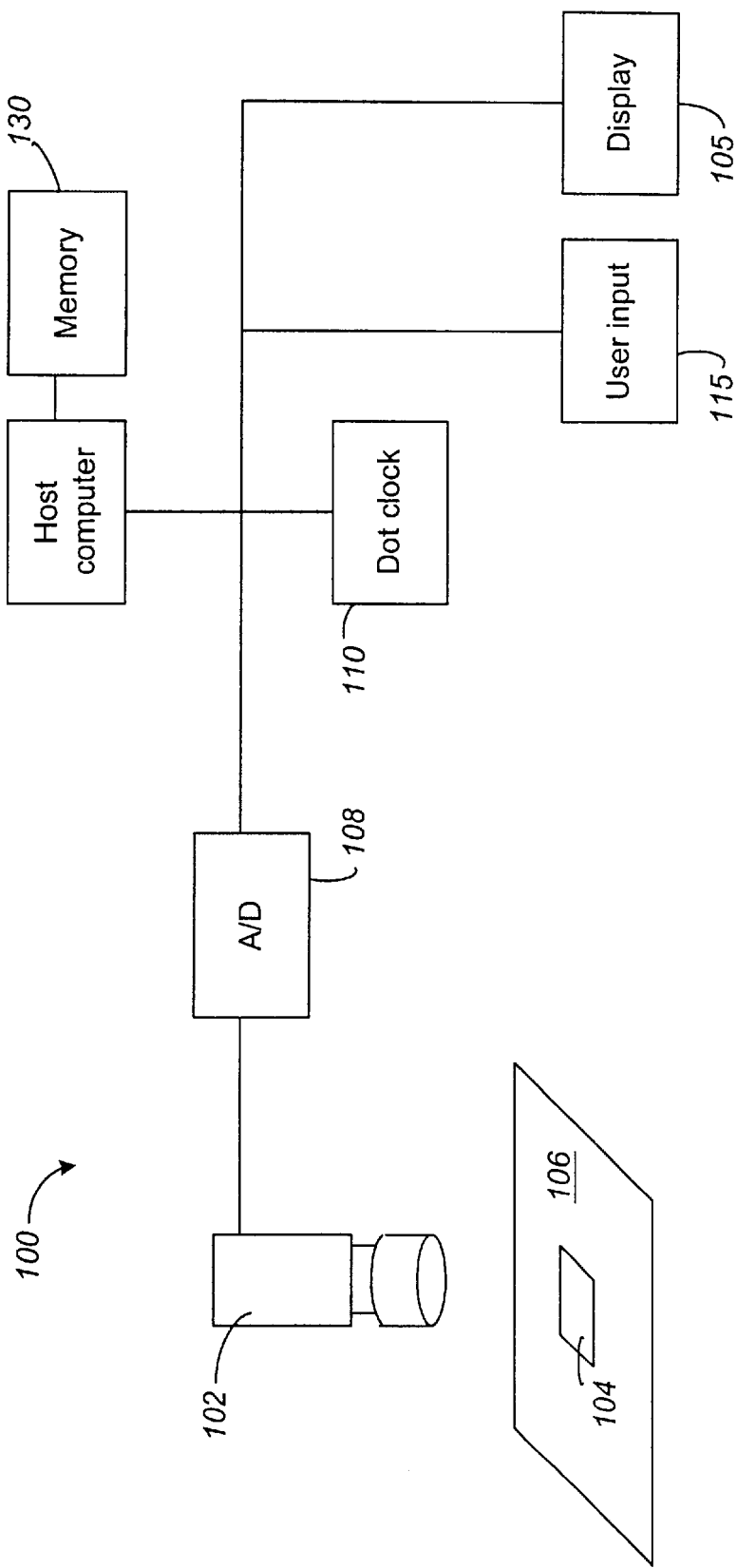
FIG. 1 is a block diagram of a machine vision system according to an embodiment.

An machine vision system according to an embodiment may be used to score cellular specimens on microscope slides stained with a dye. FIG. 1 illustrates a machine vision system 100 according to an embodiment. A camera 102, which may be analog or digital, scans the images of objects 104 on a background 106. The output of the camera may be digitized (if analog) by an analog-to-digital converter (ADC) 108. The object under inspection may be imaged in a frame of pixels, for example, an array of 680×480 pixels. Each pixel represents the instantaneous value of an optical quality (e.g., color) of the image at a location corresponding to the pixel's position in the frame. The video signal may be divided into red, green, and blue (RGB) color components by a digitizer and input to the keyed color generator in three color channels, one for each color component. A dot clock 110 generates signals corresponding to the frequency at which pixels are being scanned in the image. At each dot clock signal, the component RGB color values corresponding to the raw color value of a pixel being scanned is input to the keyed color generator. According to an embodiment, the component color values may be eight bit words.

The component color values for each pixel in the image may be stored in a digital image file. The image of the sample, e.g., a stained tissue section on a microscope slide, may be magnified when imaged. For larger samples, and/or higher magnifications, a displayable image file of the entire sample may be created by stitching together a set of frames collected when scanning the slide.

Figure 2:
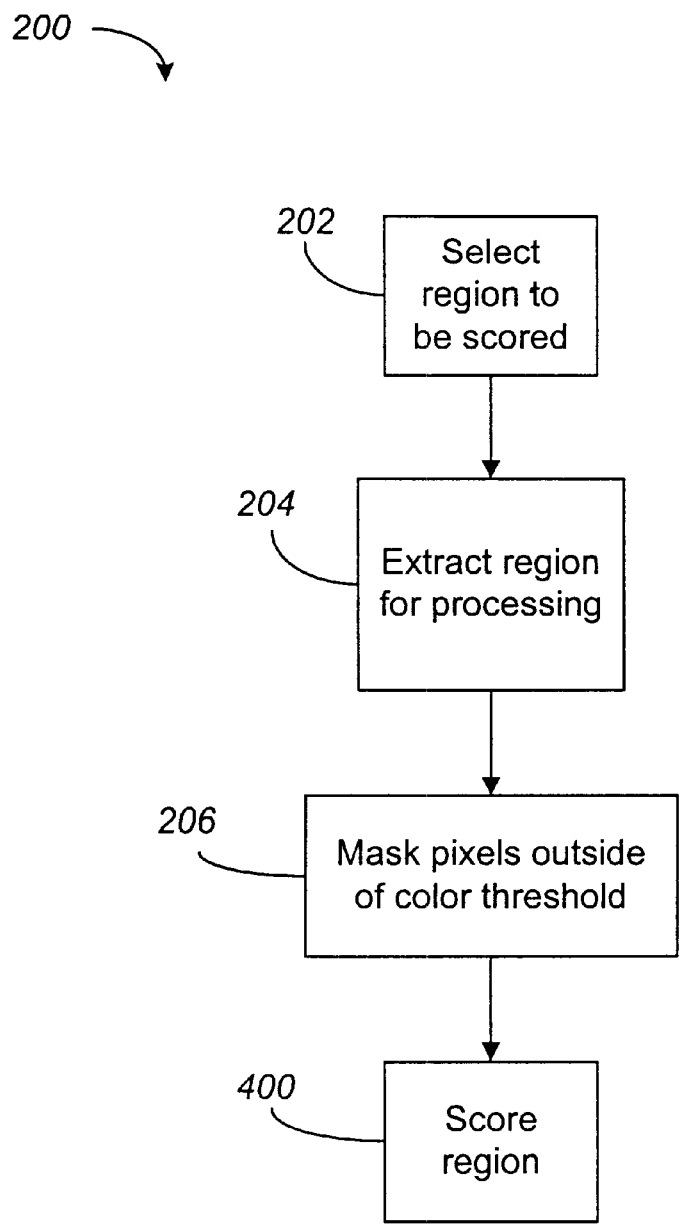
FIG. 2 is a flowchart describing an imaging operation according to an embodiment.

FIG. 2 is a flowchart describing an exemplary image processing operation 200. The image of the sample to be scored is displayed for a user, e.g., a pathologist, on a display device 105. The sample may be a tissue section stained with an IHC dye, for example, diaminobenzidine tetrahydrochloride (DAB), which forms a visible insoluble brown precipitate in the presence of a peroxidase antibody marker. The user indicates a region of a tumor in the displayed image in which the scoring is to take place (block 202), e.g., with a pointing device 115 such as a mouse. The selection by the user may be necessary because the tissue sample may not necessarily be all tumors. The region so designated may be extracted as a sub-region for further processing (block 204). This may be performed by taking a rectangular buffer which bounds the sub-region originally drawn with the pointer and masking all pixels outside of the selected sub-region. The digital value of masked pixels in the image file may be set to a default value (e.g., zero) or ignored during digital processing.

Figure 3:
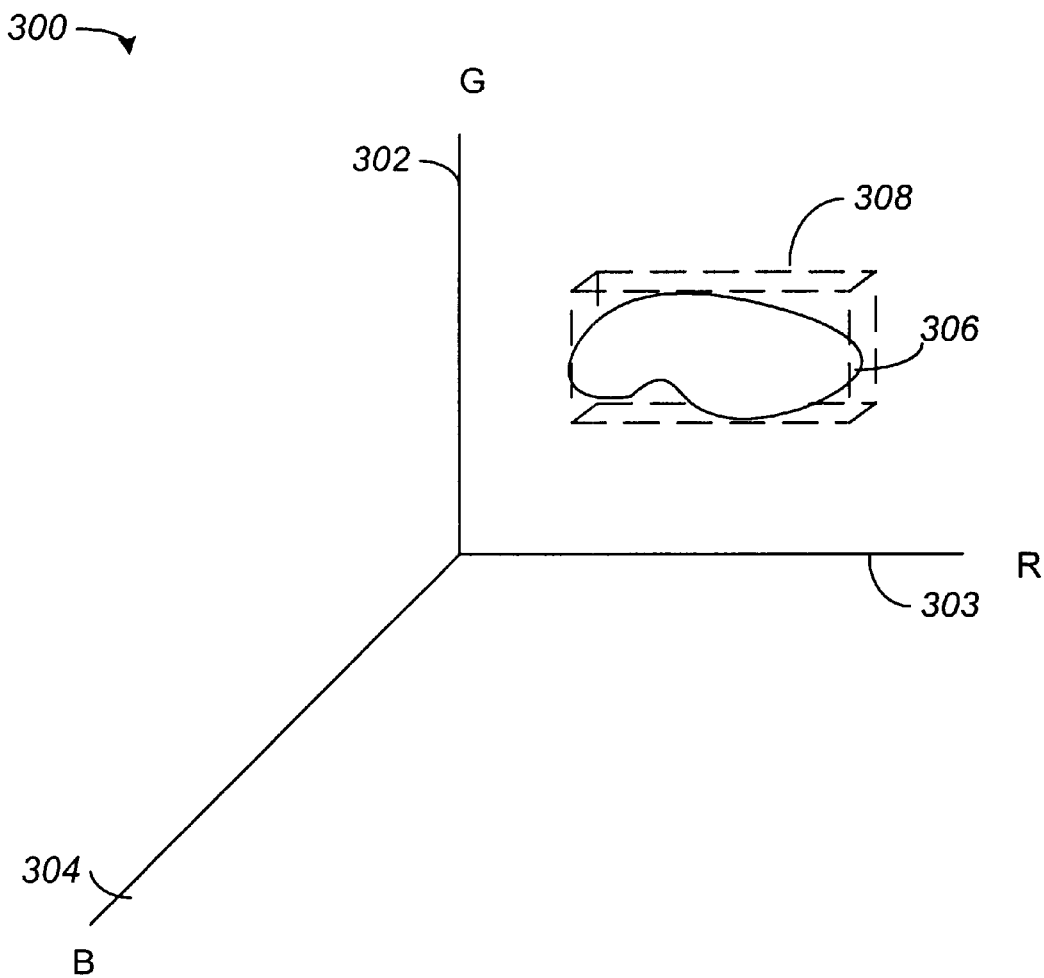
FIG. 3 is a diagram of a coordinate system in color space with a subvolume representing a color threshold according to an embodiment.

A second masking operation may be performed on pixels in the sub-region. The color values of pixels in the image may be analyzed by a masking device 120, and pixels that have a color value that falls outside a color threshold corresponding to the range of brown colors that may be produced by DAB (block 206). Colors may be conceptualized as existing in color space in which a color value is viewed as a location in a three dimensional coordinate system 300 defined by color axes 302–304, as shown in FIG. 3. According to an embodiment, these axes may be rectilinear R, G, and B axes. The 8-bit R, G, and B values of a pixel in the image may serve as the coordinates of the pixel color in this coordinate system.

The characteristic color of a common class of object, e.g., a DAB stained cell, may be represented by a subvolume 306 within color space. The coordinates in the subvolume 306 may be used to represent the color threshold. Alternatively, the subvolume may be bounded by a rectangular box 308 defined by six coordinates that correspond to the minima and maxima of the red, green, and blue color coordinate values of subvolume in order to reduce the number of parameters to define the color threshold.

The red and blue values for the pixels may be divided by their green value to produce R/G and B/G color ratios. Unlike the green value, these color ratios do not depend on the brightness of the object. This division operation effectively transforms the RGB coordinate system to a new coordinate system. This coordinate system includes one axis corresponding to brightness (green) and two axes representing color elements independent of brightness (R/G and B/G).

Alternatively, the masking device 120 may convert the representation of a pixel's color from red, green, and blue (RGB) signals 202 to hue (H), saturation (S), and intensity (I) signals. The conversion of RGB signals to HSI signals is equivalent to a transformation from the rectilinear RGB coordinate system used in color space 300, to a cylindrical coordinate system in which hue is the polar coordinate, saturation is the radial coordinate, and intensity is the axial coordinate, in which the axis lies on a line between black and white. An exemplary HIS transformation is described in U.S. patent application Ser. No. 09/631,611, filed on Aug. 4, 2000, which is hereby incorporated by reference.

After the pixels outside of the selected sub-region and outside the selected color threshold have been masked, the image including the remaining pixels may be scored. The image may be scored by measuring the color value of the pixels that is the complement of the color to be scored. For example, in the present example, the blue value of the pixels is measured because blue is the complement of brown. A pixel appears brown because blue light is being blocked more than red or green, and therefore the decrease in blue can be interpreted as the quantity of DAB. Because the camera's response is approximately logarithmic, the decrease in blue may be approximately linear with the quantity of DAB.

Figure 4:
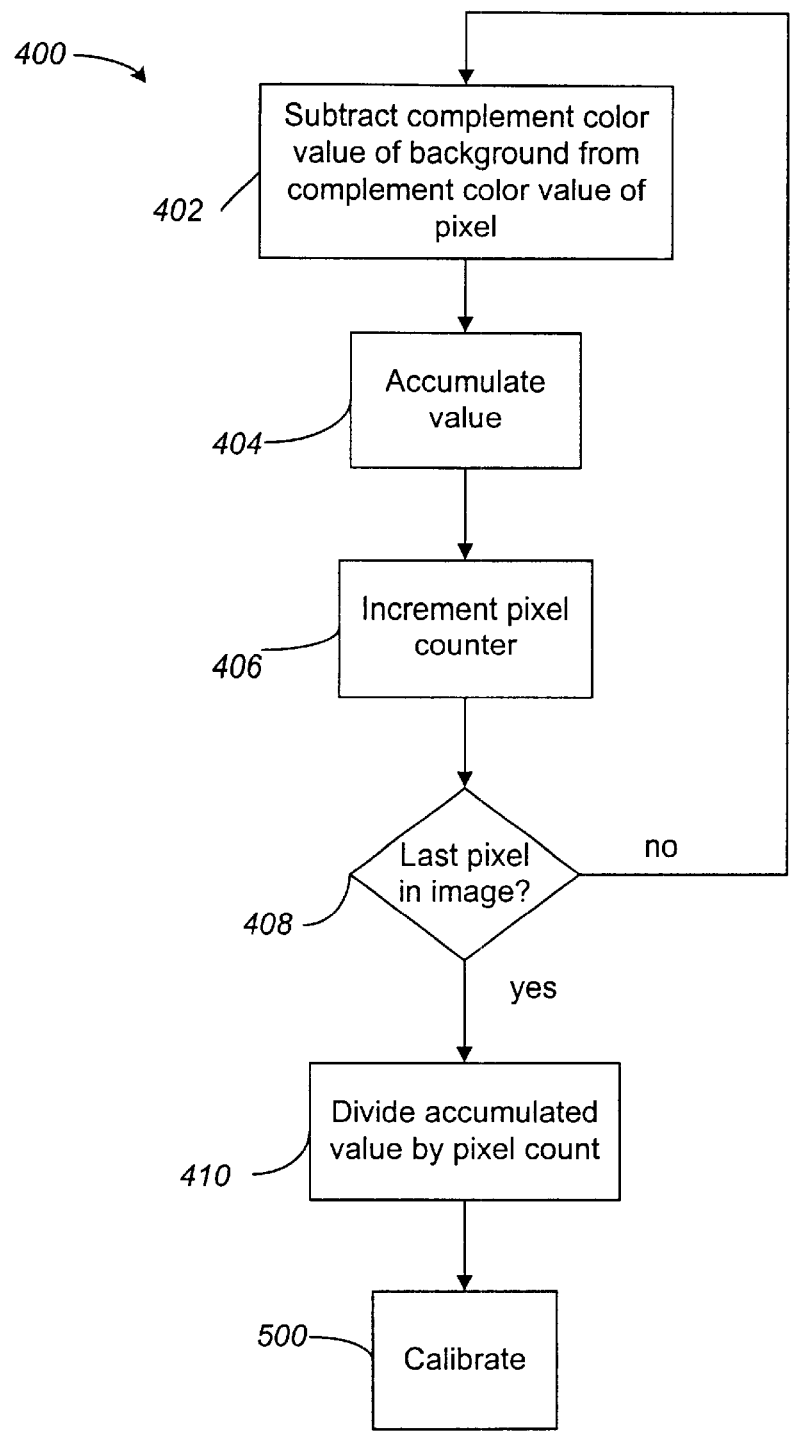
FIG. 4 is a flowchart describing a scoring operation according to an embodiment.

FIG. 4 is a flowchart describing an exemplary scoring operation 400. To score the selected region, the blue color value of a pixel, i.e., the 8-bit value of the pixel in the blue channel, is subtracted from the average blue value of the background (block 402), and a pixel counter 130 incremented (block 406). The average background value color may be determined before the scoring operation by examining a scanned frame of the background 106 prior to scanning the sample. The average blue color value of the background may be determined from the stored image file taken of the background.

The blue color value of the next pixel is then subtracted from the average blue value of the background (block 402), the difference is accumulated with the result from the previous pixel (block 404), and the pixel counter incremented (block 406). This operation is repeated for the remaining unmasked pixels (block 408). The mean DAB intensity may be determined by dividing the accumulated result by the number of pixels in the regions that meet the brown color threshold criteria (block 410).

The DAB intensity computed, using the above-described technique, may be a number ranging from 0 to 255 on a system with an 8-bit digitizer. This DAB intensity may be converted to a number on the traditional 0 to 3 scale by building a calibration curve (block 500). This curve may represent a measurement of the behavior of a reviewer.

Figure 5:
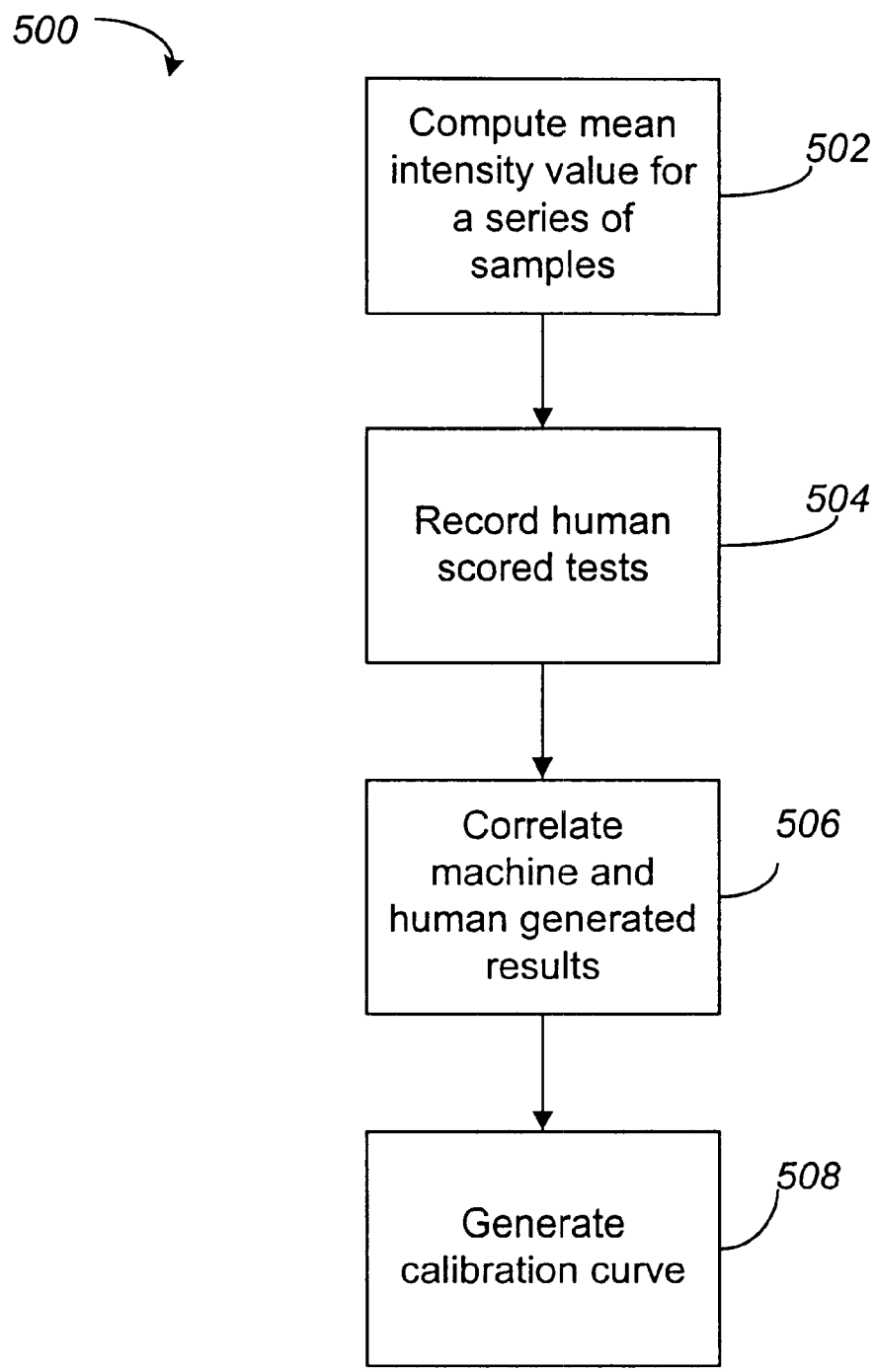
FIG. 5 is a flowchart describing a calibration operation according to an embodiment.

FIG. 5 is a flowchart describing an exemplary calibration operation 500. The curve may be generated by computing mean DAB intensity values for a series of samples (block 502). The same series of samples are presented to human reviewers such as pathologists. The reviewers score the samples using the traditional 0 to 3, whole number scale, and the results are stored in a system memory device 130 (block 504). The mean DAB intensity values are correlated to the scores provided by the reviewers (block 506). The correlated data is then used to fit to a calibration curve at 206. The curve may be used to convert a reading in instrument units (ranging from 0 to 255) to the expected 0 to 3 scale. The higher resolution of the instrument may be expressed to give fractional scores such as 2.8.

While specific embodiments of the invention have been illustrated and described, other embodiments and variations are possible. For example, although the illustrated embodiments are described in terms of antibodies to the Her2NU protein detected with DAB, the embodiments would work with any antibodies. Also, dyes other than DAB may be used to mark the antibody attachment location. The above-described technique may make use of the fact that brown is the complement of blue, to detect DAB by using the blue channel of a video system. However, an appropriate weighting of channels may be quantified by using, for example, the average of blue plus green.

The techniques described here may be implemented in hardware or software, or a combination of the two. The techniques may be implemented in computer programs executed on one or more programmable computers that may each includes a processor, a storage medium readable by the processor (including volatile and non-volatile memory and/or storage elements), and suitable input and output devices. The programmable computers may be either general-purpose computers or special-purpose, embedded systems.

A number of embodiments of the present invention have been described. Nevertheless, it will be understood that various modifications may be made without departing from the spirit and scope of the invention. For example, blocks in the flowcharts used to describe the various operations may be skipped or performed in a different order and produce desirable results. Accordingly, other embodiments are within the scope of the following claims.

What is claimed is:

1. A method comprising:
   generating an image of a sample;
   selecting a region in the sample for scoring;

determining a mean intensity value of a selected color in the region; and generating a score in response to the mean intensity value using a calibration curve.

2. The method of claim 1, wherein the selected color comprises a complement of a color to be scored.

3. The method of claim 2, further comprising generating the calibration curve, comprising:

recording a user input score for a selected region in each of a plurality of images for the color to be scored;

determining a mean intensity value for each of the plurality of selected regions for the selected color;

correlating the user input scores to the associated mean intensity values; and generating a score in response to said correlation.

4. The method of claim 3, wherein said recording the user input score comprises:

masking pixels in the image outside of the selected region;

masking pixels outside of a selected color threshold corresponding to the color to be scored; and recording a user input score of the selected region.

5. The method of claim 3, wherein the user input scores comprise whole number values.

6. The method of claim 3, wherein the generated score comprises a whole number values and a fractional value.

7. The method of claim 1, wherein said selecting a region in the sample for scoring comprises selecting a stained region in the imaged sample.

8. The method of claim 7, wherein the stained region comprises an immunohistochemistry dye.

9. The method of claim 8, wherein the immunohistochemistry dye comprises diaminobenzidine tetrahydrochloride.

10. The method of claim 9, wherein the selected color comprises blue.

11. The method of claim 1, wherein said determining the mean intensity value of the selected color in the region comprises determining an average intensity of the selected color over a plurality of pixels in the selected region.

12. An apparatus comprising:

an imager operative to generate an image comprising a plurality of pixels;

an intensity analyzer operative to determine a mean intensity value of a selected color in a plurality of pixels in a selected region of the image;

a memory device operative to store a calibration curve; and a correlator operative to generate a score in response to a determined mean intensity value for the selected region using the calibration curve.

13. The apparatus of claim 12, further comprising:

a user input device operative to enable a user select a region to be scored in the image.

14. The apparatus of claim 12, wherein the calibration curve comprises a curve generated from a plurality of user input scores and associated machine generated intensity values for a plurality of imaged samples.

15. The apparatus of claim 12, wherein the selected color is a complement of a color to be scored.

16. The apparatus of claim 12, wherein the selected region comprises stained cells.

17. The apparatus of claim 16, the stained region comprises an immunohistochemistry dye.

18. The method of claim 17, wherein the immunohistochemistry dye comprises diaminobenzidine tetrahydrochloride.

19. The method of claim 18, wherein the selected color comprises blue.

20. An article comprising a machine-readable medium which stores machine-executable instructions, the instructions operative to cause a machine to:

generate an image of a sample;

select a region in the sample for scoring;

determine a mean intensity value of a selected color in the region; and generate a score in response to the mean intensity value using a calibration curve.

21. The article of claim 20, wherein the selected color comprises a complement of a color to be scored.

22. The article of claim 21, further comprising instructions operative to cause the machine to generate the calibration curve, said instructions operative to cause the machine to:

record a user input score for a selected region in each of a plurality of images for the color to be scored;

determine a mean intensity value for each of the plurality of selected regions for the selected color;

correlate the user input scores to the associated mean intensity values; and generate a score in response to said correlation.

23. The article of claim 22, wherein the instructions operative to cause the machine to record the user input score comprise instructions operative to cause the machine to:

mask pixels in the image outside of the selected region;

mask pixels outside of a selected color threshold corresponding to the color to be scored; and record a user input score of the selected region.

24. The article of claim 22, wherein the user input scores comprise whole number values.

25. The article of claim 22, wherein the generated score comprises a whole number values and a fractional value.

26. The article of claim 20, wherein said selecting a region in the sample for scoring comprises selecting a stained region in the imaged sample.

27. The article of claim 26, wherein the stained region comprises an immunohistochemistry dye.

28. The article of claim 27, wherein the immunohistochemistry dye comprises diaminobenzidine tetrahydrochloride.

29. The article of claim 28, wherein the selected color comprises blue.

30. The article of claim 20, wherein the instructions operative to cause the machine to determine the mean intensity value of the selected color in the region comprise instructions operative to cause the machine to determine an average intensity of the selected color over a plurality of pixels in the selected region.

* * * * *